United States Patent
Stretch

[19]
[11] Patent Number: 6,074,302
[45] Date of Patent: Jun. 13, 2000

[54] FLUID DAMPER WITH HYDRAULIC SLACK

[75] Inventor: Dale A. Stretch, Novi, Mich.

[73] Assignee: Eaton Corporation, Cleveland, Ohio

[21] Appl. No.: 08/236,835

[22] Filed: May 2, 1994

[51] Int. Cl.$^7$ .................................................. B60K 41/16
[52] U.S. Cl. ................................. 464/77; 464/51; 464/87
[58] Field of Search ................................. 464/24, 27, 28, 464/51, 77, 87; 192/3.28, 3.29, 106.1; 137/857, 859; 74/574

[56] References Cited

U.S. PATENT DOCUMENTS

| | | |
|---|---|---|
| 1,751,228 | 3/1930 | Bethel . |
| 2,019,198 | 10/1935 | Spase ......................................... 64/100 |
| 2,972,241 | 2/1961 | Hackforth ................................. 464/28 |
| 3,209,780 | 10/1965 | Mercier ............................... 137/859 X |
| 4,148,200 | 4/1979 | Schallhorn et al. ........................ 64/27 |
| 4,790,793 | 12/1988 | Bacardit ..................................... 464/77 |
| 5,049,111 | 9/1991 | Jumel et al. .............................. 464/24 |
| 5,081,881 | 1/1992 | Ide ....................................... 74/574 X |
| 5,219,431 | 6/1993 | Stretch .................................... 267/261 |
| 5,240,457 | 8/1993 | Leichliter et al. ........................ 464/27 |

FOREIGN PATENT DOCUMENTS

| | | | |
|---|---|---|---|
| 2611013 | 8/1988 | France . | |
| 2 818 296 | 10/1979 | Germany ................. | 74/574 |
| 3 249 433 | 11/1991 | Japan ...................... | 464/28 |
| 2 108 240 | 5/1983 | United Kingdom ..... | 464/28 |

*Primary Examiner*—Donald P. Walsh
*Assistant Examiner*—William A. Rivera
*Attorney, Agent, or Firm*—Paul S. Rulon; L. J. Kasper

[57] ABSTRACT

A torsion isolator (34) for transmitting torque and dampening torsionals in a driveline. The isolator includes a composite c-shaped spring (48) disposed in an annular chamber (44) of a housing (38,40) filled with torque converter fluid. The spring transmits driveline torque and attenuates torsionals. The spring also functions as a fluid displacement piston by dividing the chamber into radially inner and outer volumes (44a,44b) which vary inversely in volume in response to torque changes flexing the spring. Rapid flexing of the spring increases the fluid pressure in the decreasing volume and thereby dampens or reduces the rate of spring flexing or rebound.

16 Claims, 6 Drawing Sheets

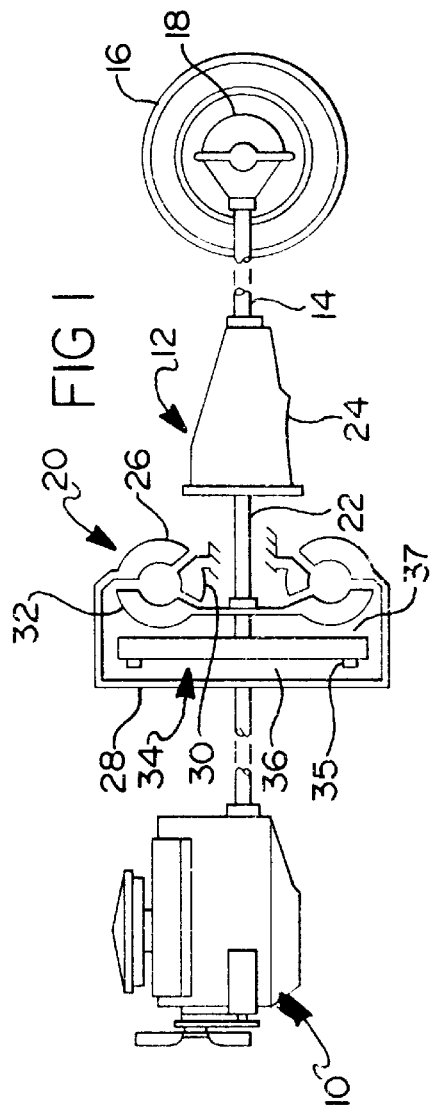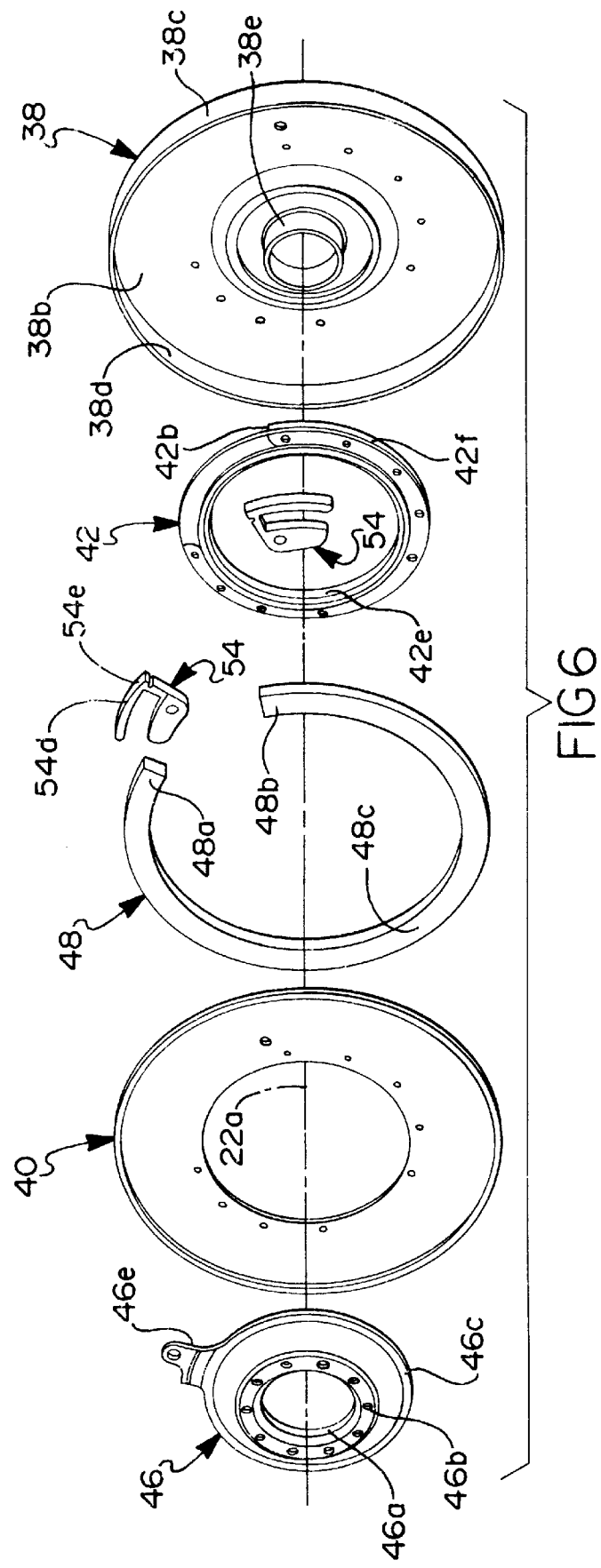

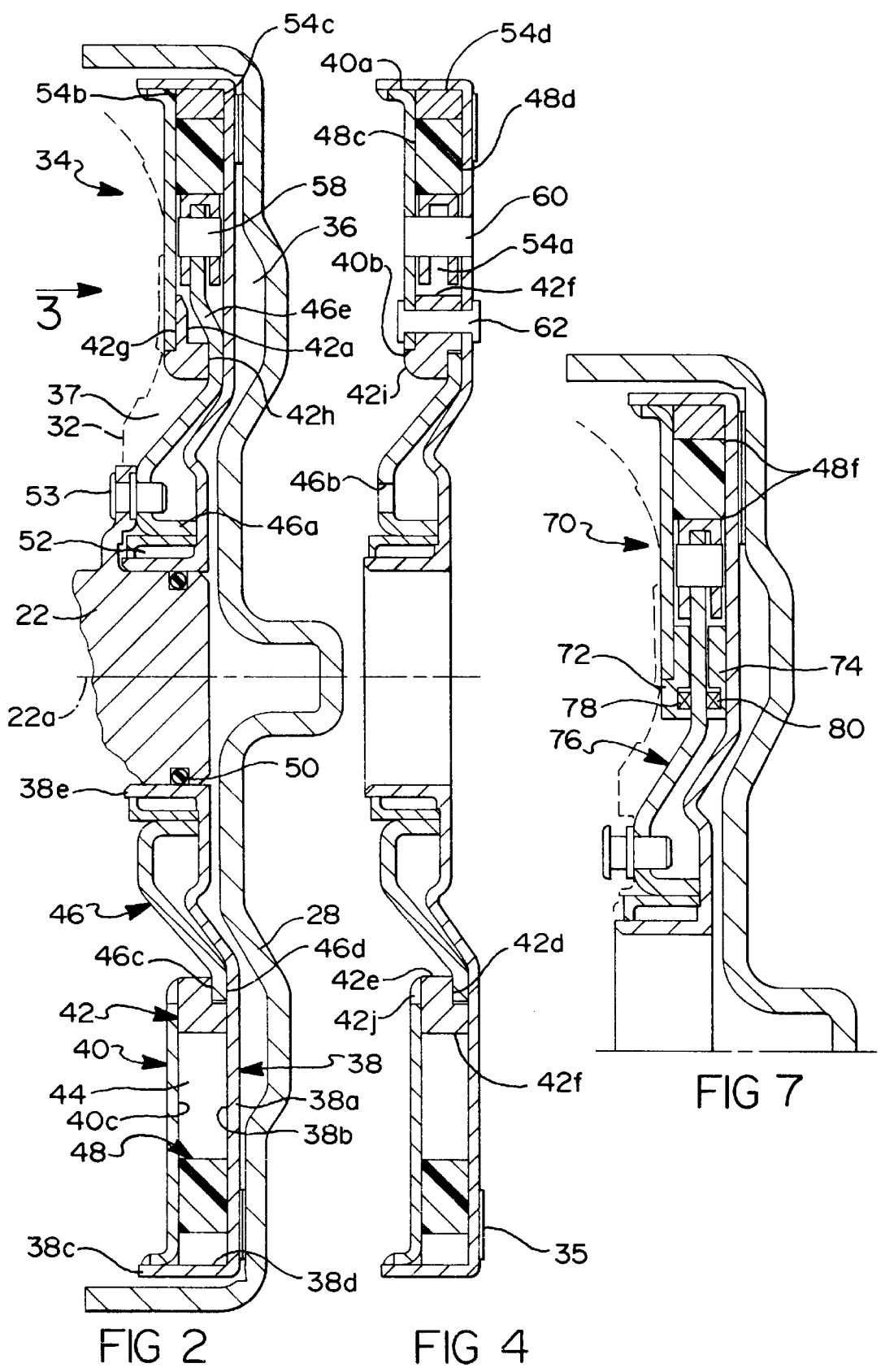

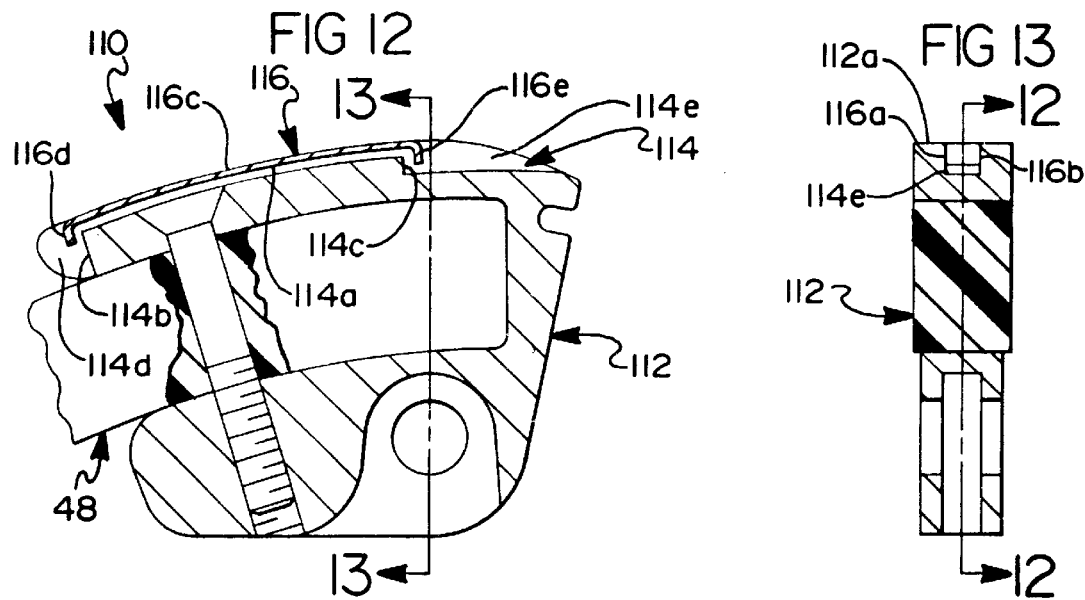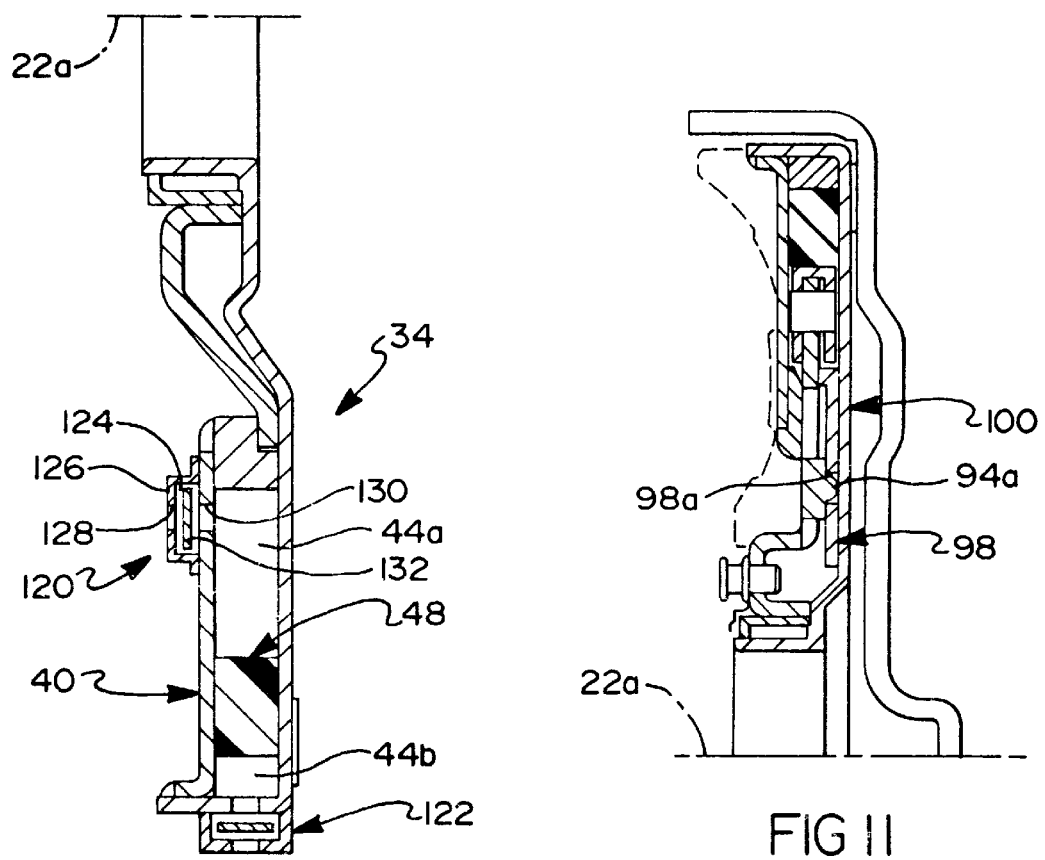

6,074,302

FLUID DAMPER WITH HYDRAULIC SLACK

CROSS-REFERENCE

This application is related to U.S. applications, Ser. Nos. 08/236,069, 08/236,809, and 08/236,838, filed on May 2, 1994, and respectively relating to inventions assigned attorney docket numbers: 93rMAR129, 93rMAR008 and 93rMAR574.

FIELD OF THE INVENTION

This invention relates to torsion isolator. More specifically, the invention relates to an isolator for attenuating and dampening vehicle driveline torsional.

BACKGROUND OF THE INVENTION

It is well known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio and ignition are uniform. However, such uniformity does not always occur, thereby producing pulses which vary substantially in frequency and amplitude. Whether uniform or not, the pulses, which are herein referred to as torsionals, are transmitted through vehicle drivelines and are perceptible to vehicle passengers. The torsionals, which manifest themselves as vibrations are detrimental to drivelines, derogate passenger-ride quality, and may cause annoying body noises. An example of body noise, known as body boom, occurs when an engine is lugged; under such a condition engine torsionals may cause body components, such as sheet metal panels, to resonate. Still further, tip-in/tip-out torque pulses, produced by abrupt engine acceleration and/or deceleration, jerk the driveline and vehicle; such torque pulses are also referred to herein as torsionals.

Torsion isolators for attenuating and dampening driveline torsionals are well known in the prior art. Such isolators commonly employ a spring(s) and a damper. The spring(s) attenuate the torsionals and transmit positive and negative torque (i.e., engine and coast torque) between the vehicle engine and wheels. The damper controls the rate of spring flexing. Examples of such isolators may be seen by reference to U.S. Pat. Nos. 5,240,457; 5,234,377; 4,782,932 and published French patent application 2,611,013. These documents are incorporated herein by reference. The torsion isolator disclosed herein is considered to have several advantages over the above torsion isolators with respect to torsional attenuation and damping, cost, and weight or inertia.

SUMMARY OF THE INVENTION

An object of the invention is to provide an improved torsion isolator.

According to a feature of this invention, a torsion isolator, such as disclosed in the previously mentioned French patent application 2,611,013 and published Aug. 19, 1988, includes a housing and a hub mounted for limited relative rotation about a common axis. The housing includes a chamber having axially and radially spaced apart interior wall surfaces. Spring means and a liquid are disposed in the chamber. The spring means have surfaces in dynamic sealing relation with the axially spaced apart walls. Attachment means connect opposite ends of the spring means to the housing and hub. The spring means flexibly transmits torque and attenuates torsionals. Interaction of the liquid with the wall and spring surfaces in response to the torsional flexing the spring means is operative to dampen the torsionals.

The improvement is characterized by the spring means dividing the chamber into at least first and second volumes which vary inversely in volume in response to the torsionals causing the spring means to flex and expand one of the volumes while decreasing the other volume to provide a pressure increase of the liquid in the decreasing volume for effecting the dampening; and control means are operative during initial torsional flexing of the spring for inhibiting the pressure increase.

BRIEF DESCRIPTION OF THE DRAWINGS

The torsion isolator of the present invention is shown in the accompanying drawings in which:

FIG. 1 is a schematic view of a motor vehicle driveline;

FIG. 2 is a detailed, sectional view of the torsion isolator disposed in a partially shown torque converter housing and looking along line 2—2 of FIG. 3;

FIG. 4 is a sectional view of the torsion isolator looking along line 4—4 of FIG. 3;

FIG. 6 is an exploded view of the torsion isolator;

FIG. 7 is a sectioned half view of a second embodiment of the torsion isolator;

FIGS. 9–11 illustrate an active counterbalance mechanism for the torsion isolator of FIGS. 2–6;

FIGS. 12 and 13 illustrate slack mechanism for the isolator of FIGS. 2–6; and

FIG. 14 illustrates an alterative slack mechanism embodiment.

DETAILED DESCRIPTION OF THE DRAWINGS

Figure 3:
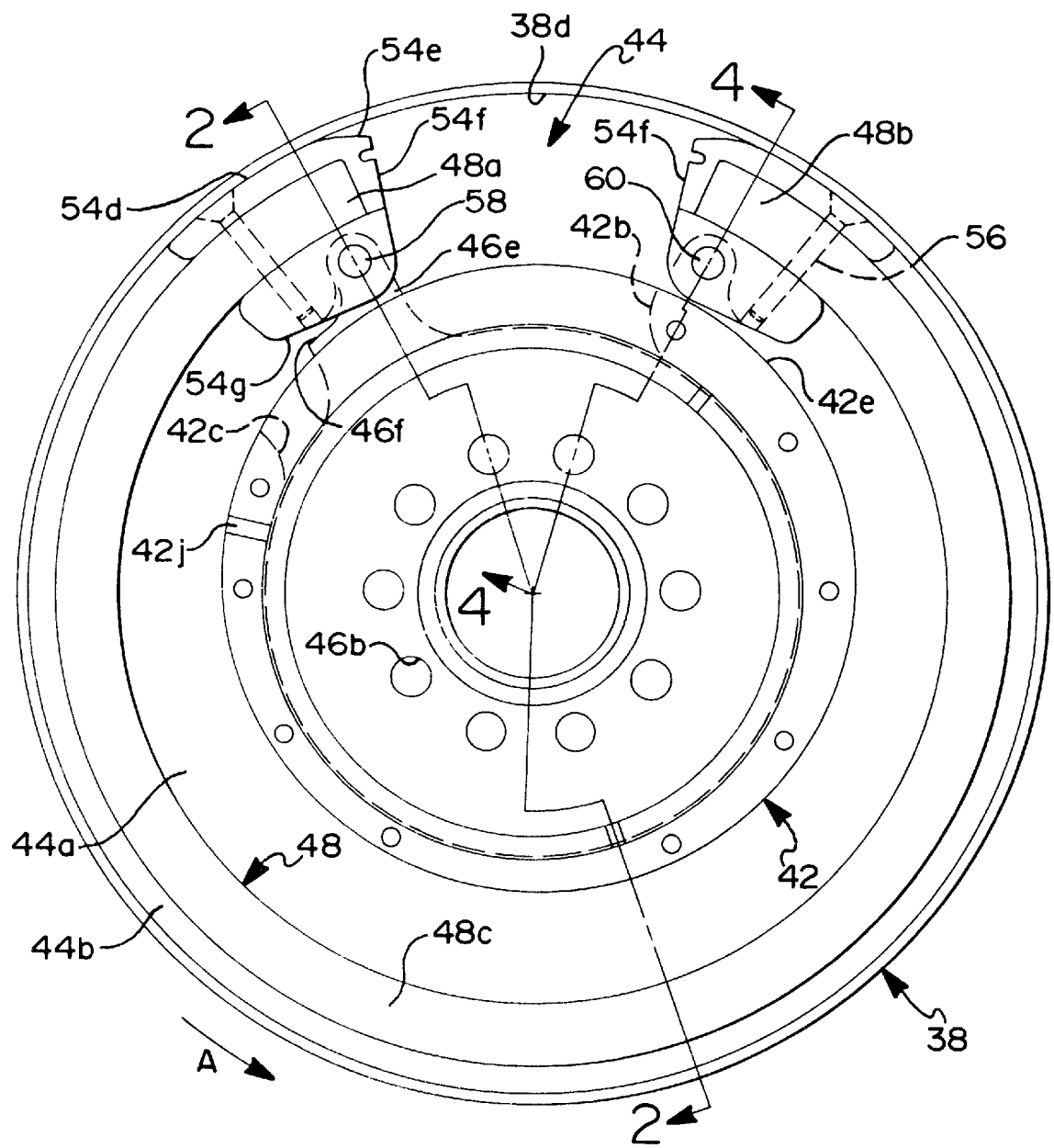
FIG. 3 is a relief view of the torsion isolator of FIG. 2 with a housing member removed and looking in the direction of arrow 3 in FIG. 2.

The motor vehicle driveline seen schematically in FIG. 1 includes an internal combustion engine 10, an automatic transmission 12 and a drive shaft 14 driving a load such as rear and/or front wheels 16 of a vehicle through a differential 18.

The transmission includes a torque converter assembly 20 having an output shaft 22 rotatable about an axis 22a (FIG. 2) and a gear ratio box 24 driven by the torque converter output shaft 22. Torque converter assembly 20 is filled with automatic transmission fluid and includes, in a known manner, an impeller 26 driven by engine 10 through a torque converter housing 28, a stator 30, and a turbine 32 driven hydrokinetically by the impeller. A fluid coupling may be employed in lieu of a torque converter.

Torque converter assembly 20 further includes the torsion isolator 34 of the present invention disposed to selectively bypass the torque converter impeller in response to pressurized torque converter fluid hydraulically moving the torsion isolator axially into frictional engagement with the torque converter housing 28 by a friction material 35 in known manner. During non-bypass operation of the torque converter, the pressurized torque converter fluid is admitted to the torque converter via a chamber 36 receiving the fluid through unshown passages in shaft 22 in known manner. The fluid in chamber 36 prevents frictional engagement of the isolator housing with the torque converter housing. The fluid in chamber 36 flows radially outward and into the torque converter in a main torque converter chamber 37 separated from chamber 36 by isolator 34. When it is desired to engage the isolator, as for example, when the vehicle is in motion, the direction of flow of the pressurized fluid is reversed by actuation of a suitable valve, not shown. Specifically, the pressurized fluid is now admitted to chamber 37 where it acts against the radially extending portion of the isolator facing chamber 37 and slides the entire isolator to the right to effect frictional engagement with the torque converter housing. Driveline torque now bypasses the torque converter and is transmitted to shaft 22 by the isolator.

Referring now to FIGS. 2–6, torsion isolator 34 comprises housing members 38,40 and an annular ring 42 defining an annular chamber 44, a hub 46, and a c-shaped spring 48. Housing member 38 includes a radially extending portion 38a having a surface 38b defining an axially facing surface of chamber 44, a radially outer and axially extending portion 38c having a cylindrical surface 38d defining a radially outer surface of the chamber, and a radially inner and axially extending portion 38e concentric to axis 22a when mounted for relative sliding and rotational movement on an end of shaft 22. Oil leakage flow between the interface of shaft 22 and housing portion 38e is prevented by an o-ring seal 50.

Hub 46 includes a radially inner and axially extending portion 46a rotatably supported on housing portion 38e by a needle bearing 52, a plurality of circumferentially spaced apart holes 46b slidably receiving extensions of fasteners 53 drivingly securing turbine 32 to shaft 22, axially oppositely facing annular surfaces 46c,46d, and an arm 46e extending radially outward from annular surfaces 46c, 46d and into annular chamber 44. Surface 46d is disposed for sliding sealing relation with a radially inner portion of housing surface 38b.

Annular ring 42 includes an arcuate opening or recess 42a having hub arm 46e extending therethrough, end surfaces 42b,42c defining the arcuate length of the recess, an axially facing annular surface 42d disposed for sliding sealing relation with hub surface 46c, an inner circumference 42e concentric to hub portion 46a, an elliptical or irregular outer circumferential surface 42f explained further hereinafter, axially spaced apart surfaces 42g,42h, an annular shoulder or ridge 42i, and three substantially equally spaced apart recesses 42j in shoulder 42i.

Figure 8:
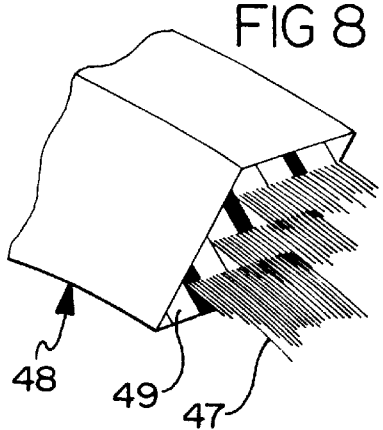
FIG. 8 is an enlarged schematic view of a portion of a composite spring illustrating layers of reinforcing filaments protruding from a matrix of plastic material.

C-shaped spring 48 is preferably, but not necessarily formed of a composite material including layers of reinforcing filaments 47 encapsulated in a matrix of plastic material 49 in known manner. See FIG. 8. Further details of such springs may be obtained by reference to U.S. Pat. Nos. 5,219,431 and 5,234,377, which are incorporated herein by reference, or from A. O. Smith Corporation, Milwaukee, Wis. U.S.A. Spring 48 includes circumferentially spaced apart and aligned ends 48a,48b and a bracket 54 affixed to each end. The brackets may be affixed to the spring ends in any of several known manners. Herein screws 58 are used. A radially inner portion of each bracket has an axial thickness less than the axial thickness of spring 48 and a slot 54a. The bracket affixed to spring end 48a loosely receives hub arm 46e in slot 54a with axial free play and is pivotally connected thereto by a pin 58 extending through openings in the bracket and arm. The bracket affixed to spring end 48b is pivotally connected to housing members 38,40 by a pin 60 extending through openings in the bracket and housing members. The bracket affixed to spring end 48b need not include slot 54a. A radially outer portion of each bracket has axially oppositely facing surfaces 54b,54c flush with axially oppositely facing surfaces 48c,48d of spring 48, a radially outwardly facing surface 54d having a radius of curvature complementary to and in sliding sealing relation with housing member surface 38d, and an edge 54e of each surface 54d has a reduced radius concentric to pins 58,60 so as to allow pivotal movement of the brackets and maintain the sliding sealing relation with the housing surface 38d.

Radial positioning of housing member 40 relative to housing member 38 and annular ring 42 is provided by outer and inner circumferential surfaces 40a,40b of housing member 40, which are snugly received respectively by housing surface 38d and ring annular shoulder 42i. Axial positioning of an axially facing surface 40c of housing member 40 relative to housing surface 38b to provide desired clearance with spring surfaces 48c,48d may be determined solely by dimensional control of the distance between annular ring surfaces 42g,42h relative to the distance between spring surfaces 48c,48d. Alternatively, the cost of dimensional control may be mitigated by positioning radially extending assembly shims (not shown) between surfaces 40c,48c of the housing and spring. The shims may be inserted through annular ring recesses 42j and removed after housing outer circumferential surface 40a is sealingly affixed, for example by welding, to housing surface 38d. Thereafter housing member 40 is affixed at a radially inner portion thereof to annular ring 42 and housing member 38 by fasteners such as rivets 62.

Figure 5:
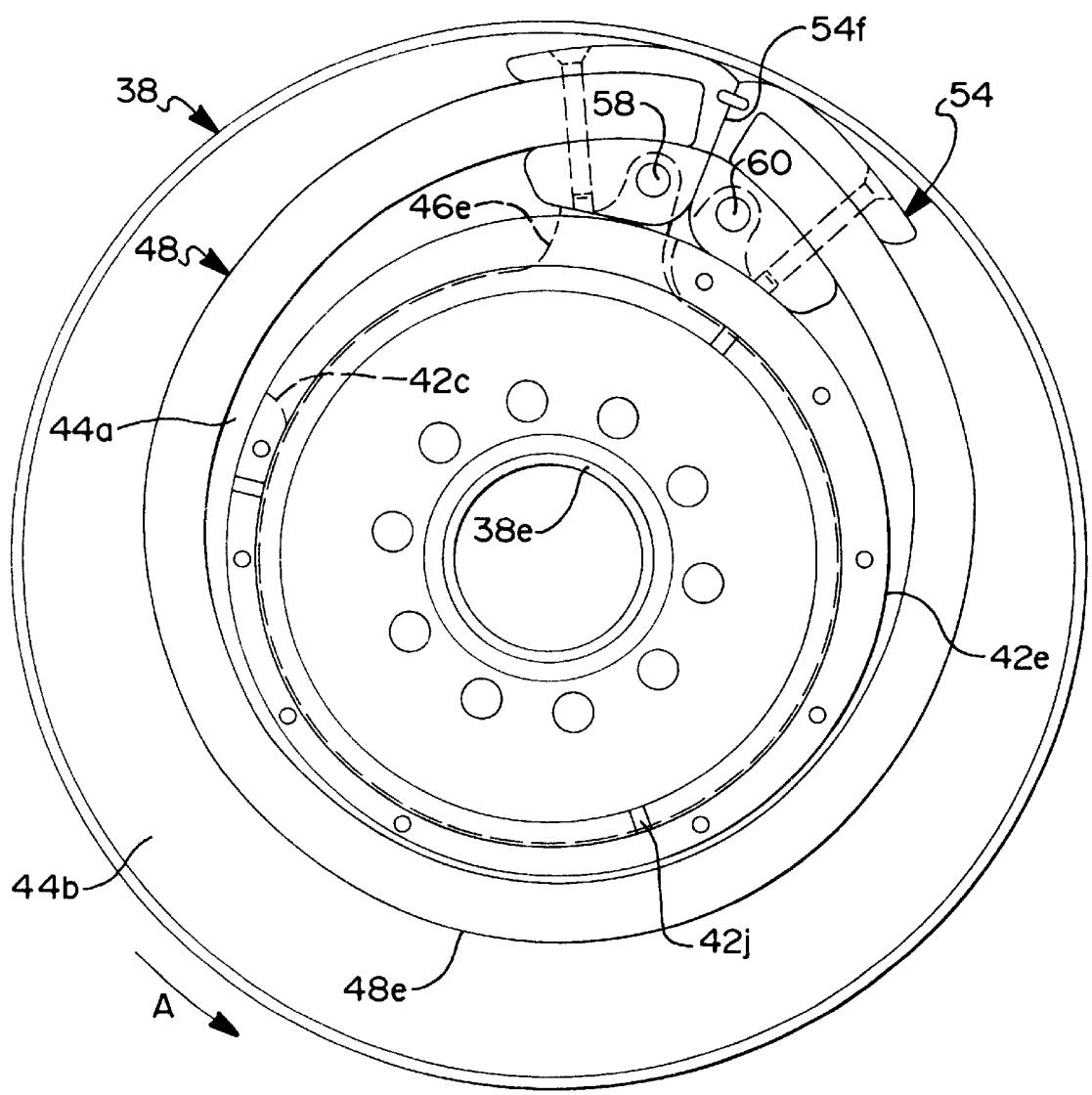
FIG. 5 is a relief view similar to FIG. 3 with a spring therein shown fully stressed in one direction.

Isolator 34, when installed, is intended to rotate in one direction as indicated by arrow A in FIGS. 3 and 5. Direction A is taken as the direction of positive torque, i.e., when torque is from the engine to the wheels. Torque in the opposite direction is taken as negative or coast mode torque which is produced when drive is from the wheels to the engine. Positive torque moves the spring ends circumferentially toward each other and decreases the spring radius. Negative torque moves the spring ends circumferentially apart and increases the spring radius. Maximum flex of spring 48 in the positive and negative directions from the neutral or unflexed position of FIG. 3 may be limited to any of several predetermined amounts. Herein, maximum flex in the positive torque direction is limited to about forty-five rotational degrees by contact of bracket end surfaces or stops 54f, as seen in FIG. 5. Maximum flex in the negative torque direction is limited to about fifteen degrees. Flex in the negative torque direction may be limited in any of several ways, for example, by hub arm 46e contact with annular ring recess end surface 42c, by contact of the spring outer circumference with housing surface 38d, etc.

The rate of spring 48 may be varied by allowing brackets 54 to pivot or not pivot about pins 58,60 while the spring is flexing. When a relatively low rate is desired, for example, when driving torque is low, pivotal movement may be allowed and then prevented at some higher torque. Herein, by way of example, brackets 54 are allowed to pivot during the first ten degrees of spring flexing in the positive direction from the neutral position. Pivotal movement of the bracket affixed to spring end 48a is arrested or stopped when a bracket surface 54g contacts a surface 46f of hub arm 46e. Pivotal movement of the bracket affixed to spring end 48b is arrested or stopped when bracket surface 54g contacts the outer surface 42e of annular ring 42.

The flexing of spring 48, as thus far described, has had to do only with respect to torque transmission and torsional attenuation functions of the spring. Spring 48 also functions as a fluid displacement piston by dividing chamber 44 into radially inner and outer volumes 44a,44b which vary inversely in volume in response to torque changes flexing the spring. The volumes are filled with torque converter fluid, are in restricted fluid communication with each other by the sealing relation between the spring and bracket surfaces and the housing surfaces, and are in restricted fluid communication with the surrounding pressurized fluid in the torque converter by the less than tight sealing relation between surfaces 38b,46d and 46c,42d to ensure full charge of the volumes. Rapid flexing of the spring increases the fluid pressure in the decreasing volume and thereby dampens or reduces the rate of spring flexing or rebound. Accordingly, housing 38,40, hub 46, spring 48 and the fluid define a fluid dampening mechanism. As may be seen by reference to FIG. 5, the elliptical or irregular surface 42e of annular ring is to allow full positive flexing of spring 48 without contact of the spring central portion 48e therewith.

The torsion isolator, as thus far described, is charged by and refilled by the pressurized fluid in the torque converter housing. Alternatively, the isolator may be better sealed as in partially shown torsion isolator 70 in FIG. 7. Isolator 70 has a modified, two piece annular ring 72,74 and hub 76 to accommodate dynamic seals 78,80. The fluid within the isolator may be other than torque converter fluid, for example, silicone oil. Further, isolator 70 may be employed in a free standing master clutch plate commonly used in non-torque converter transmissions or as an inline isolator in any type of driveline. Still further, edges of spring 48 and brackets 54 may be provided with chambers or bevels 48f to promote generation of a hydrodynamic fluid film between spring and bracket surfaces 48 c,48 d,54b,54c and housing surfaces 38b,40c for reducing friction and wear therebetween.

Rotational balance of isolator 34 is subject to change since concentricity of spring 48 relative to shaft axis 22a changes as it flexes. The changing balance may be cancelled by use of, for example, two or more springs disposed in separate chambers and circumferentially positioned about axis 22a such that the collective balance of the springs does not change as they flex. Herein, the change in balance is a relatively small amount since the spring is disposed in a closed chamber filled with a fluid whose density is relatively close to the density of the composite material of the spring. However, the change in balance would be greater if the spring were formed of a denser material such as steel, or if a single spring 48 were used in lieu of the spiral springs in U.S. Pat. No. 5,240,457, on in combination with the viscous fluid damper in U.S. Pat. No. 4,936,434 incorporated herein by reference.

Isolator 34 may also include some type of dynamic or active counterbalance mechanism to counter out of balance conditions caused by flexing of spring 48. Herein, brackets 54 function as active counterbalance mechanisms since they pivot radially inward in response to positive flexing of the spring from the neutral position of FIG. 3 to the fully flexed position of FIG. 5.

Figure 9:
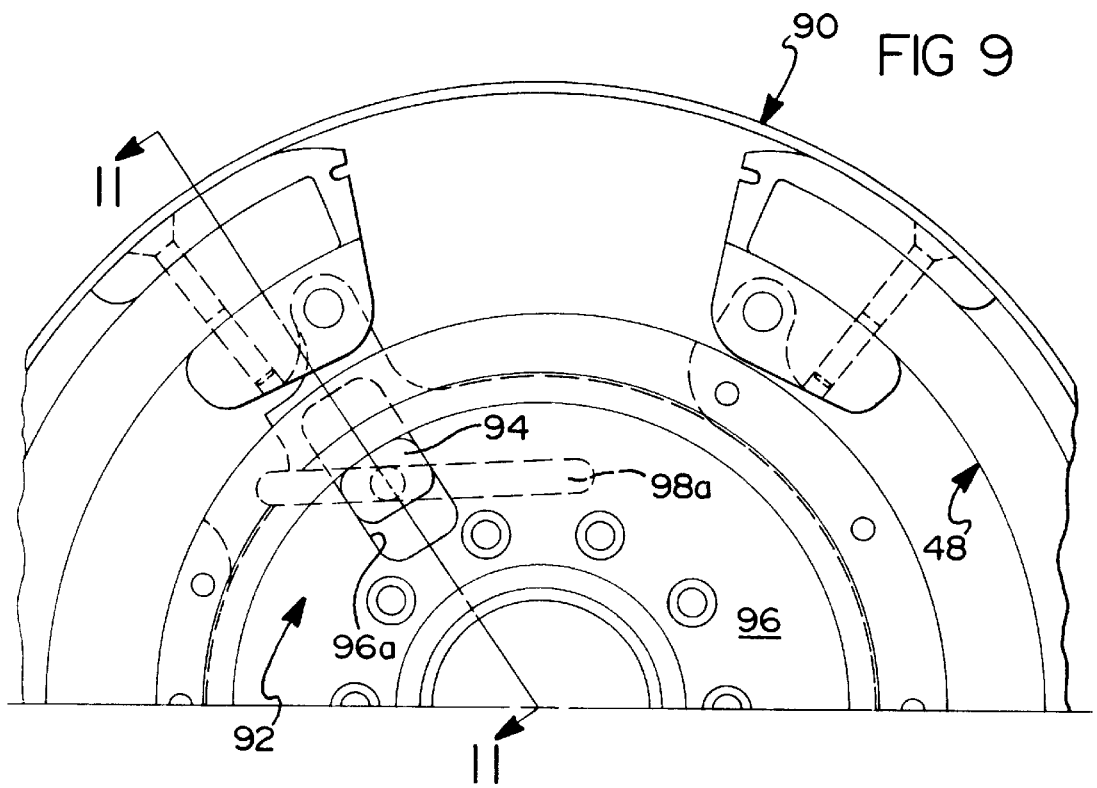
Figure 10:
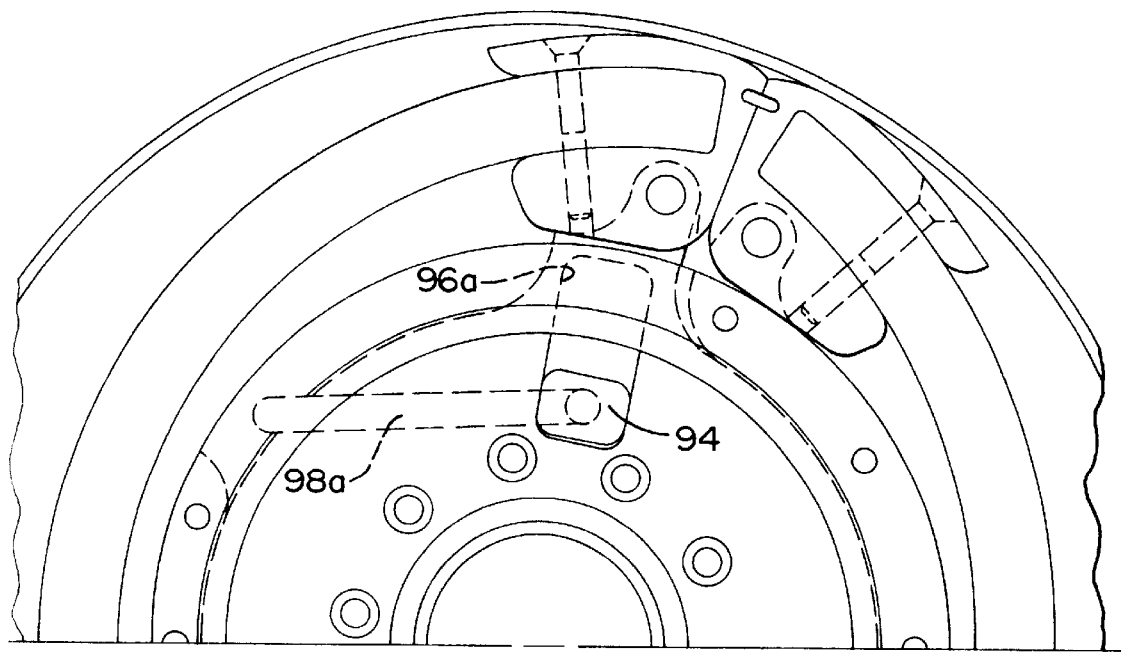

FIGS. 9–11 illustrate a torsion isolator 90 modified to include an active counterbalance mechanism 92 which may be used in lieu of or in addition to the counterbalance provided by pivoting spring brackets 54. Mechanism 92 includes a counterweight 94 disposed for radial movement in an elongated window 96a of a modified hub 96 in response to flexing of spring 48 allowing rotational movement of the hub relative to a ring 98 affixed to a housing member 100 in a manner analogous to the way rings 42 and 74 are affixed. Transmission of the radial movement is effected by a follower 94a of the weight projecting into a cam slot 98a in ring 98. As spring 48 flexes in the positive direction, slot 98a pulls weight 94 radially inward. As spring 48 flexes in the negative direction, the slot allows the weight to move radially outward. Mechanism 90 or an equivalent thereof may be disposed in any of several places in or on the torsional isolator. For example, mechanism 90 may be disposed diametrically opposite the shown position provided cam slot 98a is positioned to move the weight radially outward in response to increasing positive flex of the spring and radially inward in response to increasing negative flex. Further, cam slot 98a may have a curved profile in lieu of the linear profile shown so as to provide nonlinear movement of the weight in response to spring flex.

Isolator 34 may also be provided with a lost dampening mechanism for reducing or negating dampening of low amplitude torsionals since the effects of such torsionals are readily attenuated or masked by a long travel spring such as spring 48 without dissipation of the torsional energy by the damper. By way of example, the lost dampening mechanism may have an operative range of one or two rotational degrees on either side of a current steady state or average torque. The lost dampening may be provided by a lost motion mechanism such as disclosed in U.S. Pat. No. 4,608,883, which is incorporated herein by reference. However, the mechanism is preferably a hydraulic slack mechanism, two of such mechanisms are disclosed herein.

Referring now to FIGS. 12 and 13, therein is illustrated a first hydraulic slack mechanism 110 for allowing momentary flow of torque converter fluid from one of the radially inner or outer volumes 44a,44b to the other and thereby slow or delay pressure rise in one volume and fall in the other in response to torsionals as they tend to decrease the size of one volume and increase the size of the other volume. The amount of fluid flow allowed by mechanism 110, of course, determines the amount of slack or non-hydraulic dampening of spring flexing.

Mechanism 110 is incorporated into a spring bracket 112 which is otherwise the same as bracket 54 and which replaces one or both of brackets 54 in isolator 34. Mechanism 110 includes a circumferentially extending groove 114 formed in the radially outer surface 112a of the bracket and a circumferentially movable valving member 116 disposed in the groove. Groove 114 includes a groove portion 114a circumferentially bounded at its opposite ends by shoulders 114b,114c formed by radially deeper groove portions 114d, 114e. The valving member includes, relative to axis 22a, axially oppositely facing sides 116a,116b in close sliding relation to the axially facing sides of the groove, a circumferentially extending portion 116c having radially inwardly extending ends 116d,116e respectively received by groove portions 114d,114e and movable into sealing relation with shoulders 114b,114c. When valving member ends 116d,116e are spaced from shoulder 114b,114c, torque converter fluid can flow between the volumes 44a,44b. As pressure rises in one volume and falls in the other, the differential pressure created thereby acts on valving member ends 116d,116e and shuttles the valving member away from the rising pressure and seals the appropriate ends 116d,116e against the corresponding shoulders 114b,114c. The amount of fluid that flows during the shuttle period determines the slack or non-hydraulic dampening of the spring flex.

To provide the desired amount of slack or non-dampening in some applications, a low force spring or springs, not shown, may be employed to position valving member 116 in the neutral position shown, thereby increasing the amount of differential pressure for shuttling the valving member. Further, if or when both of the spring brackets are provided with valving member 116, one of the valving members may be biased by an unshown low force spring toward shoulder 114b thereby preventing flow from volume 44b to volume 44a and the other biased by an unshown low force spring toward shoulder 114c thereby preventing flow from volume 44a to volume 44b. This arrangement is believed to provide more precise valve control.

Referring now to FIG. 14, therein is illustrated a lower half of isolator 34 having a pair of second hydraulic slack mechanisms 120,122 for respectively allowing momentarily expansion of volumes 44a,44b as they initially start to decrease in size due to flexing of spring 48. Mechanism 120 includes an expansion compartment 124 defined by a cup-like member 126 affixed to wall 40 in any of several known manners, through passages 128,130 in wall 40 and member 126, and a floating piston or valving member 132 movable in compartment 124 between positions blocking one of the passages and unblocking the other passage. The structure and operation of mechanism 122 is basically the same as mechanism 120 and therefore is not described further.

When isolator 34 is in operation, volumes 44a,44b are alternately tending to decrease and increase in size in response to rather small torsionals caused by normal engine cylinder power pulses. Hence, a torsional that is currently now, for example, tending to decrease the size of volume 44a and increase the size of volume 44b was preceded by a torsional that had done the opposite. Accordingly, the pressure in chamber 44a is low relative to torque converter pressure surrounding the isolator and valving member 132 is sealingly seated over passage 130 as the current oncoming torsional begins. As volume 44a decreases in size due to the oncoming torsional, the pressure in volume 44a exceeds torque converter pressure, thereby moving valving member 132 to a position seated over passage 128 and allowing the size of volume 44a to increase by the size of compartment 124. An unshown low force spring may be used to bias valving member 132 over passage 130 and the corresponding valving member over the passage to chamber 44b in mechanism 122.

The appended claims are intended to cover the disclosed embodiments of the present invention and modification thereof believed to be within the spirit and scope of the invention.

What is claimed is:

1. A torsion isolator for driving connection between rotatably mounted input and output drives of a driveline; the isolator including spring means for transmitting driveline torque between the drives and an expandable chamber mechanism for to-and-fro hydraulic dampening of driveline torsionals; the mechanism including means defining at least first and second volumes which vary inversely in volume in response to the driveline torsionals effecting flexing of the spring means, a liquid in each volume, during flexing of the spring means one of the volumes increases in size while another of the volumes decreases in size to effect a pressure increase of the liquid in the other of the volumes decreasing in size for effecting said hydraulic dampening; characterized by:

control means operative during initial flexing of the spring means in response to a torsional of the driveline torsionals for momentarily inhibiting the pressure increase, the control means including a valving member movable between first and second positions respectively unblocking and substantially blocking a passage, the valving member operative while moving from the first position toward the second position to allow flow of the liquid through the passage from the other of the volumes decreasing in size for inhibiting the pressure increase therein to allow spring attenuation of low amplitude torsionals and delay a normal hydraulic dampening of the low amplitude torsionals and operative in the second position to substantially block such flow for allowing the pressure increase in the other of the volumes decreasing in size to effect a return to normal dampening during higher amplitude torsionals, the valving member being in the first position at a beginning of the torsional and in the second position in response to the torsional effecting a relatively small decrease in the other of the volumes decreasing in size.

2. The isolator of claim 1, wherein:

the passage fluidly interconnects the volumes increasing and decreasing in size, the valving member first position unblocking the passage fluidly interconnecting the volumes and the second position substantially blocking the passage interconnecting the volumes.

3. The isolator of claim 1, wherein:

a housing and a hub mounted for limited relative rotation about a common axis, the housing including a chamber having axially and radially spaced apart interior wall surfaces; the spring means and the liquid disposed in the chamber, the spring means having surfaces in sliding sealing relation with the axially spaced apart walls; attachment means connecting opposite ends of the spring means to the housing and hub;

the spring means sliding sealing relation dividing the chamber into the first and second volumes which vary inversely in volume in response to the torsionals causing the spring means to flex and move in the chamber for expanding the one of the volumes while decreasing the other of the volumes to provide the pressure increase of the liquid in the other of volumes for effecting said dampening.

4. The isolator of claim 3, wherein:

the passage fluidly interconnects the volumes increasing and decreasing in size, the valving member first position unblocking the passage fluidly interconnecting the volumes and the second position substantially blocking the passage interconnecting the volumes.

5. The isolator of claim 4, wherein:

the spring means is a c-shaped spring having the opposite ends circumferentially spaced apart and each end having a bracket affixed thereto, and the brackets respectively affixed to the housing and hub by the attachment means; and the passage formed in at least one of the brackets for fluidly interconnecting the first and second volumes, and the valving member operative to move to the second position for substantially closing the passage in response to initial pressure rise in the other of the volumes.

6. The isolator of claim 5, wherein:

at least one bracket includes a radially outer surface in sealing relation with a radially outer surface of the housing radially spaced apart surfaces, the passage including a groove formed in the bracket radially outer surface and having first and second circumferentially oppositely facing and spaced apart shoulders respectively facing the liquid in the first and second volumes, and the valving member including a circumferentially extending portion having radially inwardly extending ends circumferentially further spaced apart than the shoulders and a one of the valving member ends operative to move circumferentially into sealing engagement with the groove first shoulder for substantially blocking liquid flow from the first volume to the second volume in response to the liquid pressure in the first volume being greater than the liquid pressure in the second volume.

7. The isolator of claim 3, wherein:

the valving member includes pressure responsive means responsive to pressure in at least a one of the volumes for moving the valving member from the first position to the second position.

8. The isolator of claim 7, wherein:

the control means includes a compartment having a small volume relative to the first and second volumes; and the valving member operative in response to the moving from the first position toward the second position to connect the volume decreasing in size with the small volume via the passage.

9. The isolator of claim 1, where:

the valving member includes pressure responsive means responsive to pressure in at least a one of the volumes for moving the valving member from the first position to the second position.

10. The isolator of claim 9, wherein:

the control means includes a compartment having a small volume relative to the first and second volumes; and the valving member operative in response to the moving from the first position toward the second position to connect the volume decreasing in size with the small volume via the passage.

11. A torsion isolator including a housing and a hub mounted for limited relative rotation about a common axis, the housing including a chamber having axially and radially spaced apart interior wall surfaces; spring means and a liquid disposed in the chamber, the spring means having surfaces in sliding sealing relation with the axially spaced apart wall surfaces and the spring means having opposite ends; attachment means connecting the opposite ends of the spring means respectively to the housing and hub; the spring means for flexibly transmitting torque and attenuating torsionals, and interaction of the liquid with the wall and spring surfaces in response to the torsionals flexing the spring means operative to effect hydraulic dampening of the torsionals; characterized by:

the spring means dividing the chamber into the first and second volumes which vary inversely in volume in response to the torsionals causing the spring means to flex and expand one of the volumes while decreasing another of the volumes to provide a pressure increase of the liquid in the other of the volumes for effecting said hydraulic dampening; and control means operative during initial torsional flexing of the spring means in response to the torsionals for momentarily inhibiting the pressure increase, the control means including a valving member movable between first and second positions for respectively unblocking and substantially blocking a passage, the valving member operative while moving from the first position toward the second position to allow flow of the liquid from the other of the volumes for inhibiting the pressure increase therein to allow spring attenuation of low amplitude torsionals and delay a normal hydraulic dampening of the low amplitude torsionals and operative in the second position to substantially block such flow for allowing the pressure increase in the other of the volumes to effect a return to normal hydraulic dampening during higher amplitude torsionals.

12. The isolator of claim 11, wherein:

the passage fluidly interconnects the volumes increasing and decreasing in size, the valving member first position unblocking the passage fluidly interconnecting the volumes and the second position substantially blocking the passage interconnecting the volumes.

13. The isolator of claim 12, wherein:

the spring is a c-shaped spring having opposite ends circumferentially spaced apart and each having a bracket affixed thereto, and the brackets respectively affixed to the housing and hub by the attachment means; and the passage formed in at least one of the brackets for fluidly interconnecting the first and second volumes, and the valving member operative to move to the second position for substantially closing the passage in response to initial pressure rise in the other of the volumes.

14. The isolator of claim 13, wherein:

at least one bracket includes a radially outer surface in sealing relation with a radially outer surface of the housing radially spaced apart surfaces, the passage including a groove formed in the bracket radially outer surface and having first and second circumferentially oppositely facing and spaced apart shoulders respectively facing the liquid in the first and second volumes, and the valving member including a circumferentially extending portion having radially inwardly extending ends circumferentially further spaced apart than the shoulders and a one of the valving member ends operative to move circumferentially into sealing engagement with the groove first shoulder for substantially blocking liquid flow from the first volume to the second volume in response to the liquid pressure in the first volume being greater than the liquid pressure in the second volume.

15. The isolator of claim 11, wherein:

the valving member includes pressure responsive means responsive to pressure in at least a one of the volumes for moving the valving member from the first position to the second position.

16. The isolator of claim 15, wherein:

the control means includes a compartment having a small volume relative to the first and second volumes; and the valving member operative in response to the moving from the first position toward the second position to connect the volume decreasing in size with the small volume via the passage.

* * * * *